US012482982B2

(12) United States Patent
Li et al.

(10) Patent No.: US 12,482,982 B2
(45) Date of Patent: Nov. 25, 2025

(54) ELECTRICAL CONNECTOR

(71) Applicant: Advanced Connectek Inc., New Taipei (TW)

(72) Inventors: Yubin Li, New Taipei (TW); Qihui Zhu, New Taipei (TW); Pin-Yuan Hou, New Taipei (TW); Shu-Fen Wang, New Taipei (TW)

(73) Assignee: Advanced Connectek Inc., New Taipei (TW)

( * ) Notice: Subject to any disclaimer, the term of this patent is extended or adjusted under 35 U.S.C. 154(b) by 383 days.

(21) Appl. No.: 17/993,827

(22) Filed: Nov. 23, 2022

(65) Prior Publication Data

US 2023/0170645 A1 Jun. 1, 2023

(30) Foreign Application Priority Data

Nov. 26, 2021 (CN) ......................... 202111420157.6

(51) Int. Cl.
*H01R 13/52* (2006.01)

(52) U.S. Cl.
CPC ..... *H01R 13/5216* (2013.01); *H01R 13/5202* (2013.01)

(58) Field of Classification Search
CPC ............ H01R 13/5216; H01R 13/5202; H01R 2201/06
USPC ........................................................... 439/271
See application file for complete search history.

(56) References Cited

U.S. PATENT DOCUMENTS

| | | | | |
|---|---|---|---|---|
| 10,193,271 | B2 * | 1/2019 | Yu | H01R 12/58 |
| 10,819,062 | B2 * | 10/2020 | Hsu | H01R 13/5202 |
| 2017/0162975 | A1 * | 6/2017 | Tsai | H01R 24/60 |
| 2018/0034194 | A1 * | 2/2018 | Ono | H01R 31/08 |
| 2019/0067867 | A1 * | 2/2019 | Zhou | H01R 13/5216 |
| 2021/0143571 | A1 * | 5/2021 | Xu | H01R 13/6584 |
| 2021/0210896 | A1 * | 7/2021 | Xu | H01R 12/716 |

FOREIGN PATENT DOCUMENTS

| | | | | |
|---|---|---|---|---|
| CN | 209880944 U * | 12/2019 | | |
| CN | 109217012 | 5/2020 | | |
| KR | 20180103472 A * | 9/2018 | | H01R 13/5202 |

* cited by examiner

*Primary Examiner* — Tulsidas C Patel
*Assistant Examiner* — Jeffrey Mountain
(74) *Attorney, Agent, or Firm* — JCIPRNET

(57) ABSTRACT

An electrical connector, including an insulating body, multiple terminals, a metal shell, a collar, and a water-proof glue, is provided. The terminals are disposed in the insulating body. The metal shell is disposed outside the insulating body and surrounds the insulating body and the terminals. The collar is sleeved onto an outer wall of the metal shell. The collar has a first plate portion, a second plate portion, and a bending portion. The bending portion is connected between the first plate portion and the second plate portion. The first plate portion is connected to the outer wall of the metal shell, and the second plate portion is away from the outer wall of the metal shell. The water-proof glue is disposed between the second plate portion of the collar and the bending portion and the outer wall of the metal shell.

17 Claims, 5 Drawing Sheets

ELECTRICAL CONNECTOR

CROSS-REFERENCE TO RELATED APPLICATION

This application claims the priority benefit of China application serial no. 202111420157.6, filed on Nov. 26, 2021. The entirety of the above-mentioned patent application is hereby incorporated by reference herein and made a part of this specification.

BACKGROUND

Technical Field

The disclosure relates to an electrical connector.

Description of Related Art

There are increasing demands for water-proof and dust-proof existing electronic devices, especially for the interfaces of the electronic device configured to dispose connectors, such as USB interface, audio interface, network interface, etc. Redesigning of the structure of the interface is necessary, so as to fulfill the above-mentioned water-proof and dust-proof demands.

In general, the structure related to water-proof in the prior art is mainly through sleeving a water-proof collar made of a material such as rubber onto the housing of the connector. However, such water-proof means needs to be manufactured separately, so the manufacturing and assembly costs are relatively high, and the water-proof means is also easy to fall off from the housing.

SUMMARY

The disclosure provides an electrical connector, which is sleeved onto an outer wall of a metal shell by a collar. Then, a water-proof glue is disposed between the collar and the outer wall to form a simple and firm water-proof structure.

The electrical connector of the disclosure includes an insulating body, multiple terminals, a metal shell, a collar, and a water-proof glue. The terminals are disposed in the insulating body. The metal shell is disposed outside the insulating body and surrounds the insulating body and the terminals. The collar is sleeved onto an outer wall of the metal shell. The collar has a first plate portion, a second plate portion, and a bending portion. The bending portion is connected between the first plate portion and the second plate portion. The first plate portion is connected to the outer wall of the metal shell, and the second plate portion is away from the outer wall of the metal shell. The water-proof glue is disposed between the second plate portion of the collar and the bending portion and the outer wall of the metal shell.

The electrical connector of the disclosure includes an insulating body, multiple terminals, a metal shell, a collar, and a water-proof glue. The terminals are disposed in the insulating body. The metal shell is disposed outside the insulating body and surrounds the insulating body and the terminals. The collar is sleeved onto an outer wall of the metal shell. The collar has a first plate portion, a second plate portion, and a bending portion. The bending portion is connected between the first plate portion and the second plate portion. The first plate portion is connected to the outer wall of the metal shell, and the second plate portion is substantially perpendicular to the outer wall of the metal shell. The water-proof glue is disposed between the second plate portion of the collar and the bending portion and near a front edge of the outer wall of the metal shell.

As a preferred embodiment, the water-proof glue is an elastic ultraviolet (UV) glue.

As a preferred embodiment, the bending portion has a camber adjacent to the first plate portion and the second plate portion, and the camber faces the outer wall of the metal shell.

As a preferred embodiment, a tangent plane of the camber forms an acute angle relative to the outer wall of the metal shell.

As a preferred embodiment, the collar is formed by sheet metal processing of equal-thickness plates to form the first plate portion, the bending portion, and the second plate portion.

As a preferred embodiment, the bending portion has an inclined plane adjacent to the first plate portion and the second plate portion, and the inclined plane faces the outer wall of the metal shell.

As a preferred embodiment, the inclined plane forms an acute angle relative to the outer wall of the metal shell.

As a preferred embodiment, the collar is formed by die casting processing of a metal material to form the first plate portion, the bending portion, and the second plate portion.

As a preferred embodiment, the electrical connector is an electrical receptacle connector, which is configured to be assembled inside a housing of an electronic device, and the housing abuts against the water-proof glue.

In an embodiment of the disclosure, a material of the collar is metal, and the first plate portion of the collar and the outer wall of the metal shell form a laser welding structure.

In an embodiment of the disclosure, a material of the collar is plastic, and the first plate portion of the collar and the outer wall of the metal shell form an insert molding structure.

As a preferred embodiment, the outer wall of the metal shell has a front edge configured to connect to another electrical connector. The bending portion and the outer wall of the metal shell form a tapered recess, the outer wall of the metal shell has a flat profile from the front edge to the tapered recess, and the water-proof glue is filled between the front edge and the tapered recess.

Based on the above, after the electrical connector is sleeved onto the outer wall of the metal shell by the collar, the water-proof glue is disposed between the outer wall of the metal shell and the collar to serve as a water-proof structure of the electrical connector. Furthermore, the collar includes the first plate portion, the bending portion, and the second plate portion. The first plate portion is connected to the outer wall of the metal shell, the second plate portion is away from the outer wall of the metal shell, and the bending portion is connected between the first plate portion and the second plate portion. The collar forms a space accommodating the water-proof glue by the above structural characteristics, so that the water-proof glue is located between the second plate portion and the bending portion and the outer wall of the metal shell. Accordingly, the simple structure formed by sleeving the collar onto the metal shell with the water-proof glue effectively enables the cured water-proof glue to provide the required firm and water-proof effect for the electrical connector.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
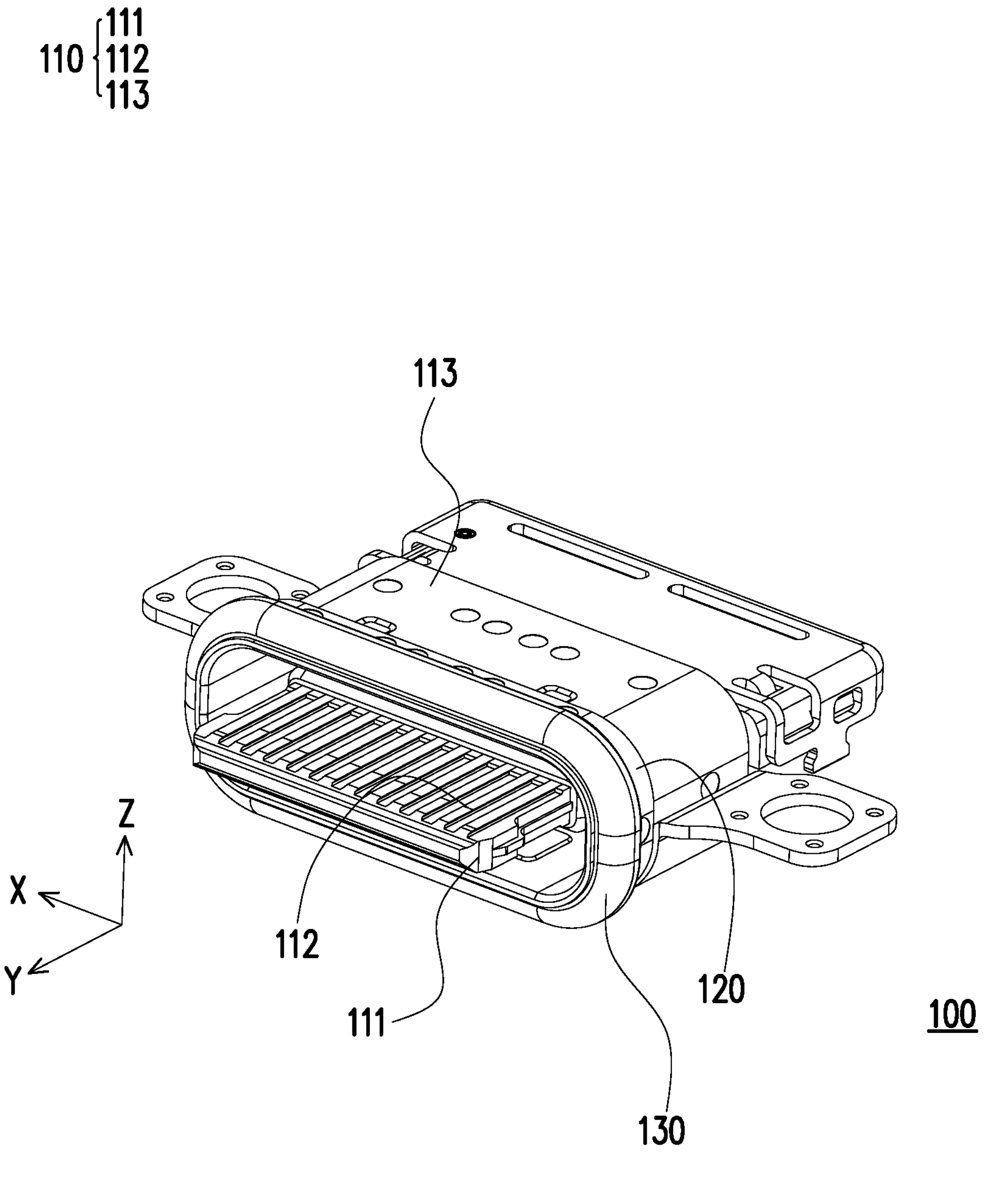
FIG. 1 is a schematic view of an electrical connector according to an embodiment of the disclosure.
Figure 2:
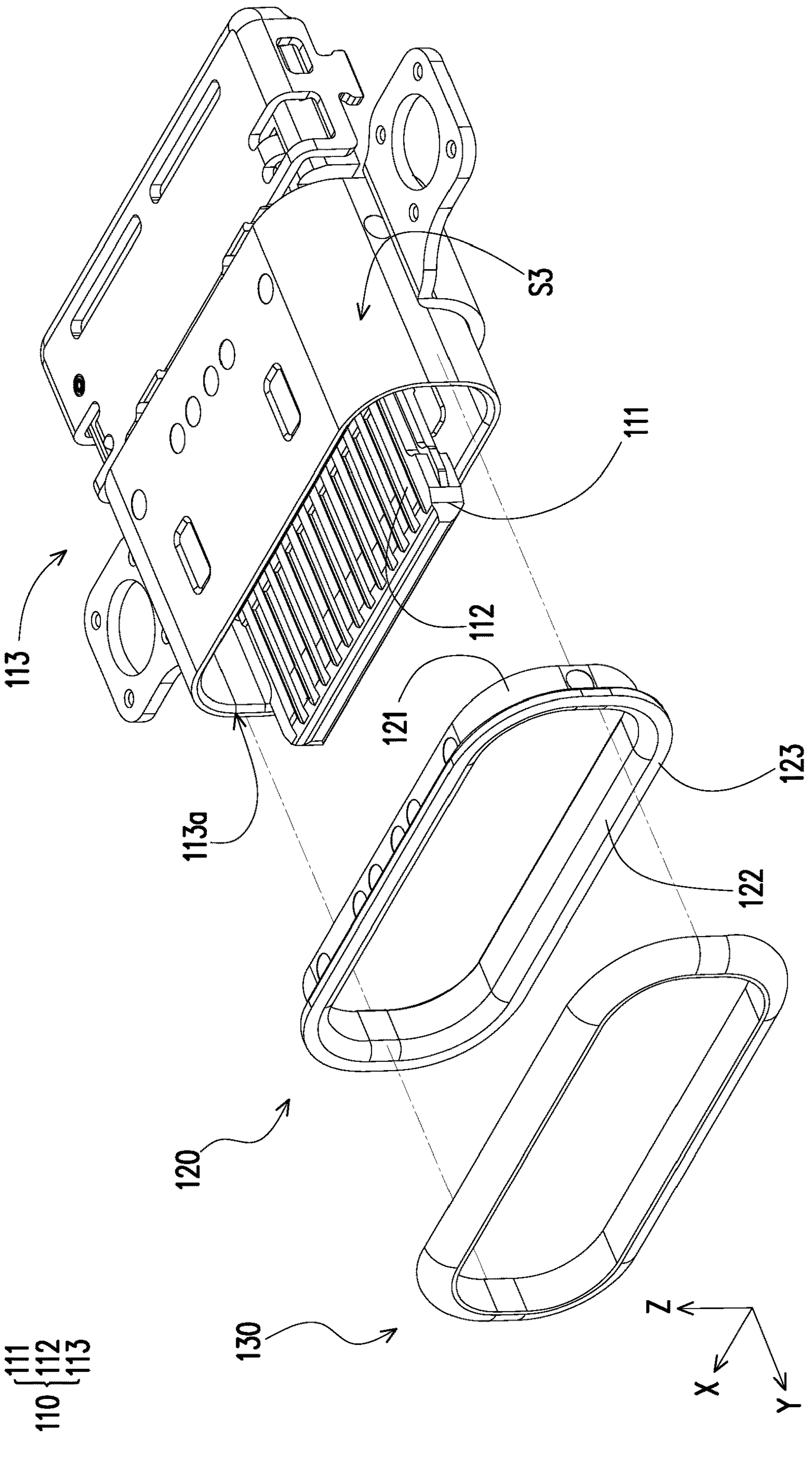
FIG. 2 is an exploded view of the electrical connector of FIG. 1.

FIG. 1 is a schematic view of an electrical connector according to an embodiment of the disclosure. FIG. 2 is an exploded view of the electrical connector of FIG. 1. Rectangular coordinates X-Y-Z are also provided here to facilitate identification and description of related components. Referring to FIG. 1 and FIG. 2 together, in this embodiment, an electrical connector 100 includes a main body structure 110, a collar 120, and a water-proof glue 130. The main body structure 110 further includes an insulating body 111, multiple terminals 112, and a metal shell 113. The terminals 112 are disposed in the insulating body 111 and are exposed from opposite sides of the insulating body 111 to facilitate connection with another electrical connector (not shown) along the Y-axis. The metal shell 113 is disposed outside the insulating body 111 and surrounds the insulating body 111 and the terminals 112. The collar 120 is sleeved onto an outer wall S3 of the metal shell 113. The collar 120 is further divided into a first plate portion 121, a second plate portion 123, and a bending portion 122. The bending portion 122 is connected between the first plate portion 121 and the second plate portion 123. The first plate portion 121 is connected to the outer wall S3 of the metal shell 113, and the second plate portion 123 is away from the outer wall S3 of the metal shell 113. The water-proof glue 130 is disposed between the collar 120 and the outer wall S3 of the metal shell 113.

Figure 3:
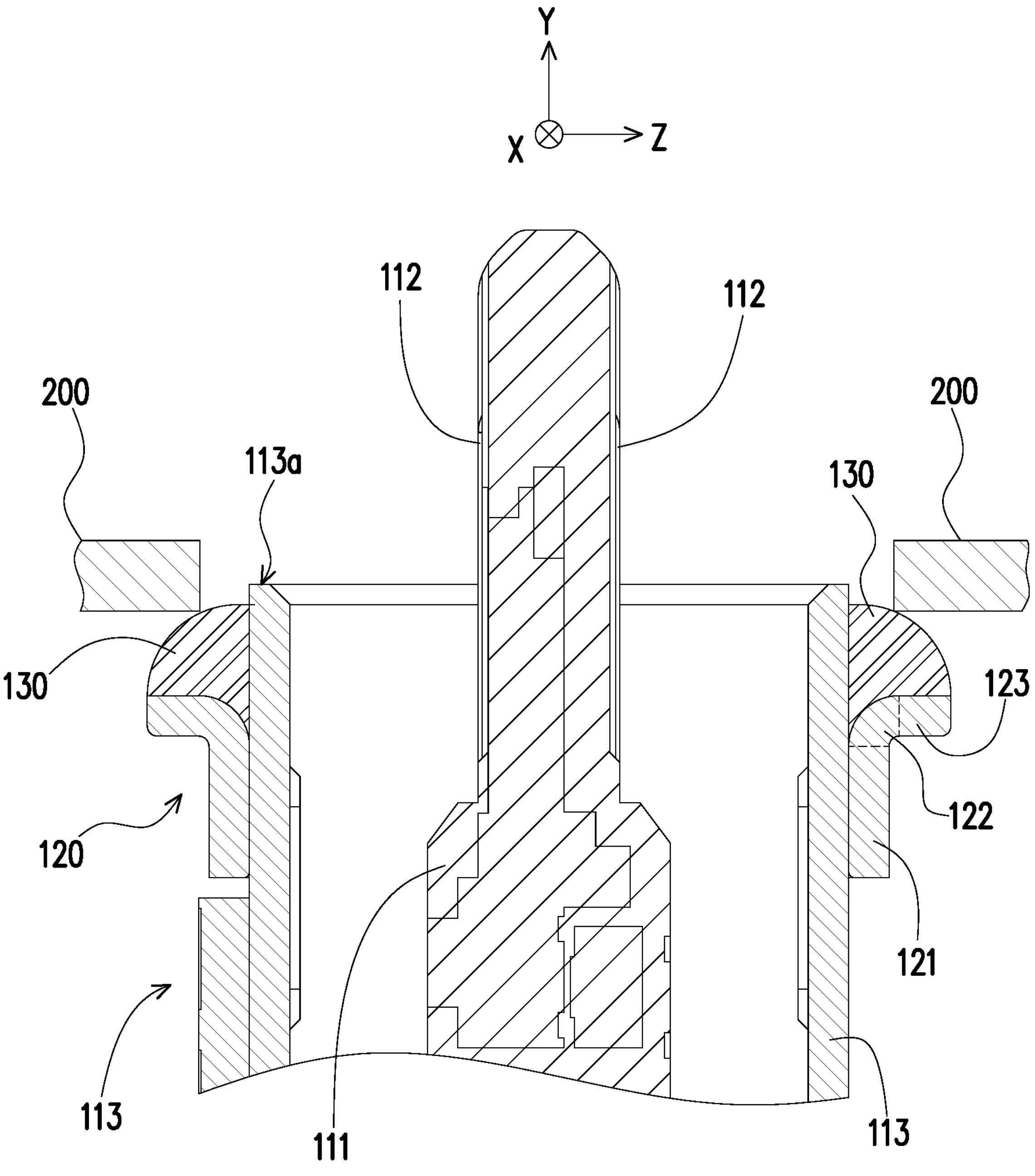
FIG. 3 is a partial cross-sectional view of the electrical connector of FIG. 1.

FIG. 3 is a partial cross-sectional view of the electrical connector of FIG. 1. Referring to FIG. 2 and FIG. 3 together, in this embodiment, the electrical connector 100 is an electrical receptacle connector configured to be assembled inside a housing 200 of an electronic device. The housing 200 abuts against the water-proof glue, as shown in FIG. 3, to prevent moisture or dust from the external environment from entering the housing 200 of the electronic device through the gap between the electrical connector 100 and the housing 200, that is, the electrical connector 100 can be provided with the required water-proof and dust-proof functions while being disposed in the electronic device. Moreover, the water-proof glue 130 of this embodiment is an elastic UV glue (UV-curable glue). Therefore, the originally fluid glue becomes an elastic body after being cured by ultraviolet rays, so as to be pressed by the housing 200 to provide a sealing effect to the inner region of the housing 200 while being effectively adhered between the outer wall S3 of the metal shell 113 and the collar 120.

Figure 4:
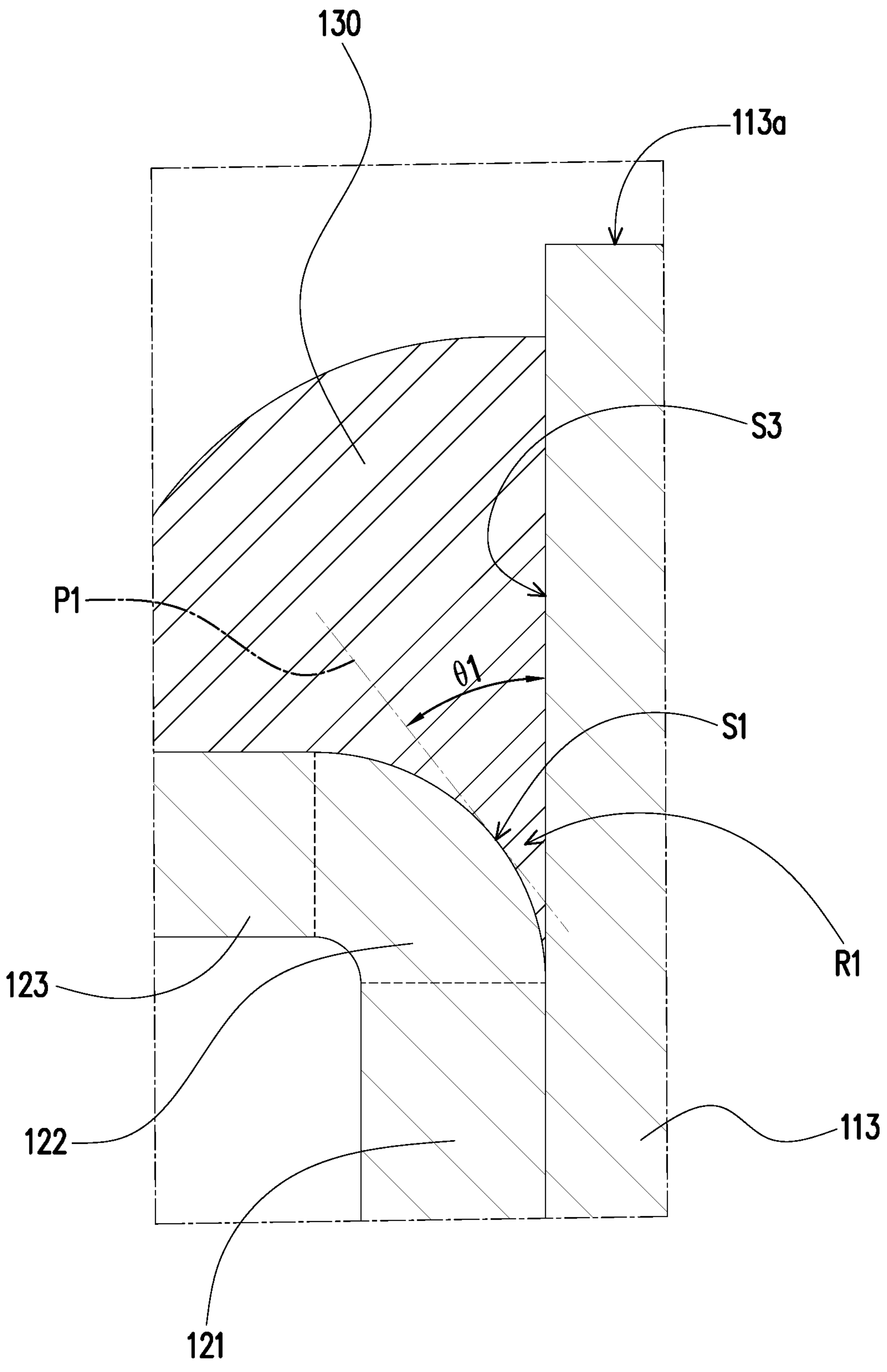
FIG. 4 is a partially enlarged view of the electrical connector of FIG. 3.

FIG. 4 is a partially enlarged view of the electrical connector of FIG. 3. Referring to FIG. 3 and FIG. 4 together, in this embodiment, the bending portion 122 has a camber S1 adjacent to the first plate portion 121 and the second plate portion 123, and the camber S1 faces the outer wall S3 of the metal shell 113. The outer wall S3 of the metal shell 113 has a front edge 113*a* configured to connect with another electrical connector (not shown). The bending portion 122 and the outer wall S3 of the metal shell 113 form a tapered recess R1. The outer wall S3 of the metal shell 113 has a flat profile from the front edge 113*a* to the tapered recess R1, which facilitates the filling of the water-proof glue 130 between the front edge 113*a* and the tapered recess R1. In the manufacturing process of the electrical connector 100 of this embodiment, after finishing the manufacture and assembly of the main body structure 110, the collar 120 is then sleeved onto the outside of the metal shell 113. In this case, the material of the collar 120 is metal, so that at least part of the first plate portion 121 can form a laser welding structure with the outer wall S3 of the metal shell 113. That is, the first plate portion 121 and the metal shell 113 are welded together by laser welding. In this way, the tapered recess R1 as shown in FIG. 3 and FIG. 4 can be formed. Next, the UV glue with fluidity is coated between the metal shell 113 and the collar 120. After the UV glue is smoothly filled in the tapered recess R1, the UV glue is eventually irradiated by an UV light curing device (not shown). The cured water-proof glue 130 becomes an elastic body, so as to be assembled with the housing 200.

In another embodiment which is not shown in the drawings, the material of the collar 120 may also be plastic, and an insert molding process is correspondingly used to combine the collar 120 with the metal shell 113. That is, the first plate portion 121 of the collar 120 and the outer wall S3 of the metal shell 113 form an insert molding structure, which can also form the structural characteristics shown in FIG. 1 to FIG. 4.

As shown in FIG. 3 and FIG. 4, in this embodiment, the second plate portion 123 is substantially perpendicular to the outer wall S3 of the metal shell 113, an included angle θ1 formed by a tangent plane P1 of the bending portion 122 relative to the outer wall S3 of the metal shell 113 is an acute angle. In other words, the tapered recess R1 formed by the camber S1 and the outer wall S3 is beneficial for the above-mentioned coating process of the UV glue, that is, to provide a drainage space for the UV glue with fluidity. Therefore, the adhesive area of the UV glue with the collar 120 and the metal shell 113 can be increased, that is, the water-proof glue 130 can be smoothly filled between the second plate portion 123, the bending portion 122, and the outer wall S3 of the metal shell 113. Also, in terms of the cross section of the metal shell 113, the outer wall S3 of the metal shell 113 has a flat profile from the front edge 113*a* to the tapered recess R1 without any protrusion or recess, which is beneficial for the operator to perform the coating operation of the glue. Simply speaking, the operator only needs to place the main body structure 110 and the collar 120 that has been sleeved onto as shown in FIG. 3 (equivalent to making the front edge 113*a* face up) for the UV glue to be smoothly coated in the space as shown in the drawing. Also, after curing, the water-proof glue 130 is disposed between the second plate portion 123 of the collar 120 and the bending portion 122, and is also near the front edge 113*a* of the outer wall S3 of the metal shell 113, such that the adhesive strength of the metal shell 113, the collar 120, and the water-proof glue 130 and the overall structural strength can also be improved. It should be noted that the tangent plane P1 may be any tangent plane on the camber S1, and the one shown in the drawing is only one of the implementations, which allows this embodiment to form a recess of a single-sided camber profile as shown in the drawing.

Conversely, when the tangent plane of the bending portion forms a right angle or an obtuse angle relative to the outer wall of the metal shell instead of the acute angle mentioned above in the disclosure, the collar and the metal shell at this time are unable to form the required tapered recess R1 of this embodiment structurally. Therefore, the coating operation of the UV glue and the expected functions of the water-proof glue 130 of the disclosure may be affected.

Figure 5:
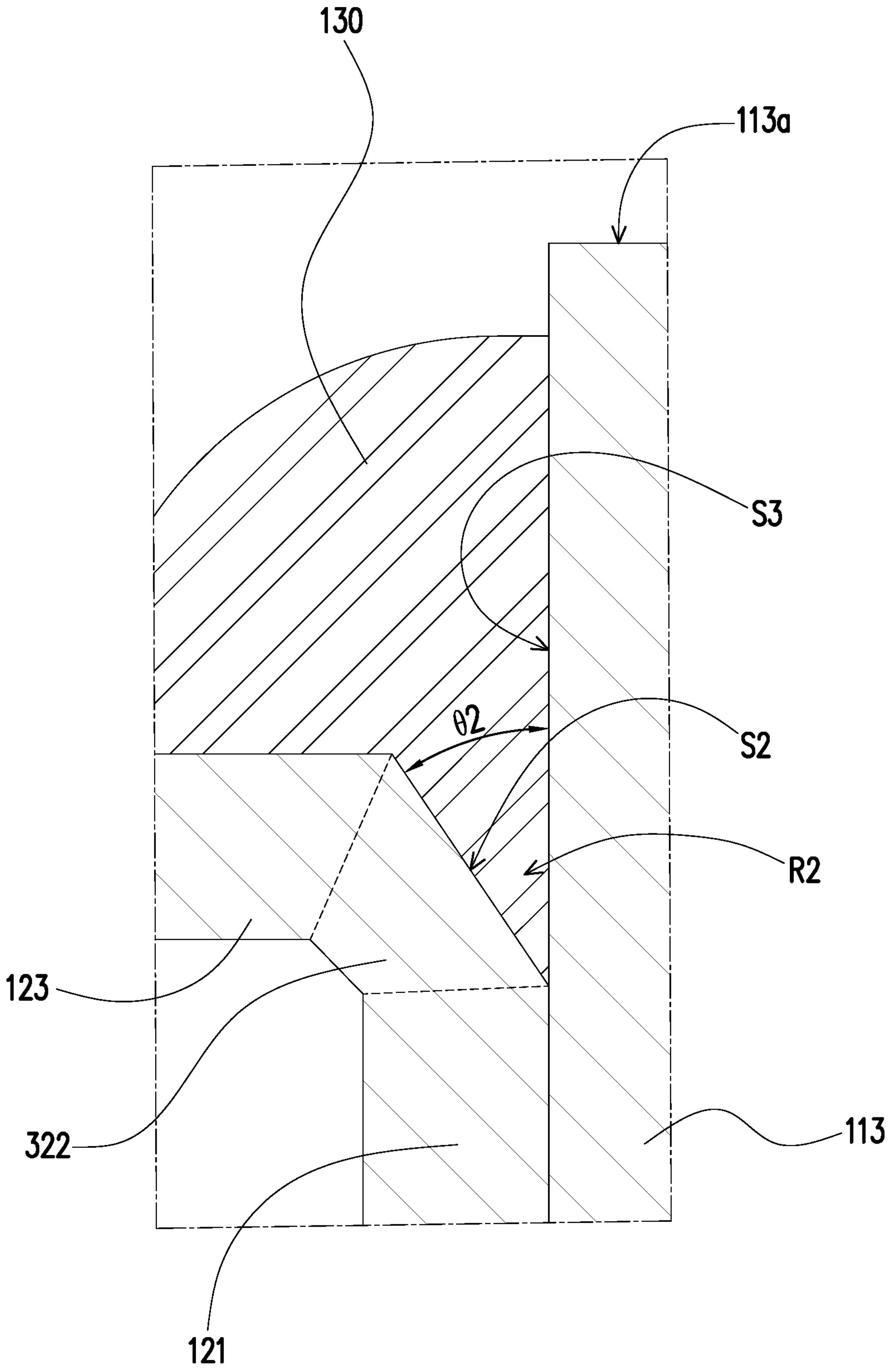
FIG. 5 is a partial cross-sectional view of an electrical connector according to another embodiment of the disclosure.

FIG. 5 is a partial cross-sectional view of an electrical connector according to another embodiment of the disclosure. Referring to FIG. 5 and comparing with FIG. 4, different from the bending portion 122 as shown in FIG. 4, the bending portion 322 of this embodiment has an inclined plane S2 adjacent to the first plate portion 121 and the second plate portion 123, and the inclined plane S2 faces the outer wall S3 of the metal shell 113. In this case, an included angle θ2 formed by the inclined plane S2 relative to the outer wall S3 of the metal shell 113 is also an acute angle, thereby forming a tapered recess R2, which can produce the same effect on the water-proof glue 130 as in the previous embodiment.

It can be seen from FIG. 4 and FIG. 5 above that due to the presence of the bending portion 122 (and the bending portion 322), the collar 120 has the effect of a chamfer structure. Both the fillet shown in FIG. 4 and the bevel shown in FIG. 5 can provide guidance when coating the water-proof glue 130. After the water-proof glue 130 is cured, since the chamfer structure forms the tapered recess R1 (and the tapered recess R2) with the metal shell 113, the adhesive area of the water-proof glue 130 and the metal shell 113 and the collar 120 can be increased, which is beneficial for improving the adhesive strength of the water-proof glue 130 and the overall structural strength after curing.

In summary, in the above embodiments of the disclosure, after the electrical connector is sleeved onto the outer wall of the metal shell by the collar, the water-proof glue is disposed between the outer wall of the metal shell and the collar to serve as a water-proof structure of the electrical connector. Furthermore, the collar includes the first plate portion, the bending portion, and the second plate portion. The first plate portion is connected to the outer wall of the metal shell, the second plate portion is away from the outer wall of the metal shell, and the bending portion is connected between the first plate portion and the second plate portion. The collar forms a space accommodating the water-proof glue by the structural characteristics, so that the water-proof glue is located between the second plate portion and the bending portion and the outer wall of the metal shell.

In an embodiment, the bending portion has the camber, while in another embodiment, the bending portion has the inclined plane. Nevertheless, both of the above embodiments allow the collar and the metal shell of the disclosure to form the required tapered recess, thereby providing guidance for the water-proof glue (UV glue) before curing while increasing the adhesive area of the cured UV glue and the metal shell and the collar, which is also equivalent to improving the overall structural strength of the electrical connector. Accordingly, the simple structure of the disclosure formed by sleeving the collar onto the metal shell with the water-proof glue effectively enables the cured water-proof glue to provide the required firm and water-proof effect for the electrical connector.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electrical connector, comprising:
an insulating body;
a plurality of terminals, disposed in the insulating body;
a metal shell, disposed outside the insulating body and surrounding the insulating body and the terminals;
a collar, sleeved onto an outer wall of the metal shell, wherein the collar has a first plate portion, a second plate portion, and a bending portion, the bending portion is connected between the first plate portion and the second plate portion, the first plate portion is connected to the outer wall of the metal shell, and the second plate portion is away from the outer wall of the metal shell; and
a water-proof glue, disposed between the second plate portion of the collar and the bending portion and the outer wall of the metal shell, wherein the bending portion has an inclined plane adjacent to the first plate portion and the second plate portion, and the inclined plane faces the outer wall of the metal shell.

2. The electrical connector according to claim 1, wherein the water-proof glue is an elastic UV glue.

3. The electrical connector according to claim 1, wherein the bending portion has a camber adjacent to the first plate portion and the second plate portion, and the camber faces the outer wall of the metal shell.

4. The electrical connector according to claim 3, wherein a tangent plane of the camber forms an acute angle relative to the outer wall of the metal shell.

5. The electrical connector according to claim 3, wherein the collar is formed by sheet metal processing of equal-thickness plates to form the first plate portion, the bending portion, and the second plate portion.

6. The electrical connector according to claim 5, wherein the inclined plane forms an acute angle relative to the outer wall of the metal shell.

7. The electrical connector according to claim 1, wherein the collar is formed by die casting processing of a metal material to form the first plate portion, the bending portion, and the second plate portion.

8. The electrical connector according to claim 1, wherein the electrical connector is an electrical receptacle connector configured to be assembled inside a housing of an electronic device, and the housing abuts against the water-proof glue.

9. The electrical connector according to claim 1, wherein a material of the collar is metal, and the first plate portion of the collar and the outer wall of the metal shell form a laser welding structure.

10. The electrical connector according to claim 1, wherein a material of the collar is plastic, and the first plate portion of the collar and the outer wall of the metal shell form an insert molding structure.

11. The electrical connector according to claim 1, wherein the outer wall of the metal shell has a front edge configured to connect to another electrical connector, the bending portion and the outer wall of the metal shell form a tapered recess, the outer wall of the metal shell has a flat profile from the front edge to the tapered recess, and the water-proof glue is filled between the front edge and the tapered recess.

12. An electrical connector, comprising:
an insulating body;
a plurality of terminals, disposed in the insulating body;
a metal shell, disposed outside the insulating body and surrounding the insulating body and the terminals;

a collar, sleeved onto an outer wall of the metal shell, wherein the collar has a first plate portion, a second plate portion, and a bending portion, the bending portion is connected between the first plate portion and the second plate portion, the first plate portion is connected to the outer wall of the metal shell, and the second plate portion is substantially perpendicular to the outer wall of the metal shell; and a water-proof glue, disposed between the second plate portion of the collar and the bending portion and near a front edge of the outer wall of the metal shell, the bending portion has an inclined plane adjacent to the first plate portion and the second plate portion, the inclined plane faces the outer wall of the metal shell, and the inclined plane forms an acute angle relative to the outer wall of the metal shell.

13. The electrical connector according to claim 12, wherein the water-proof glue is an elastic UV glue.

14. The electrical connector according to claim 12, wherein the bending portion has a camber adjacent to the first plate portion and the second plate portion, and the camber faces the outer wall of the metal shell.

15. The electrical connector according to claim 14, wherein a tangent plane of the camber forms an acute angle relative to the outer wall of the metal shell.

16. The electrical connector according to claim 14, wherein the collar is formed by sheet metal processing of equal-thickness plates to form the first plate portion, the bending portion, and the second plate portion.

17. The electrical connector according to claim 12, wherein the collar is formed by die casting processing of a metal material to form the first plate portion, the bending portion, and the second plate portion.

* * * * *